United States Patent [19]

Takahashi et al.

[11] Patent Number: 5,325,213
[45] Date of Patent: Jun. 28, 1994

[54] IMAGE READER AND BOOK DOCUMENT READER WITH A PAGE TURNING CAPABILITY FOR AN IMAGE FORMING APPARATUS

[75] Inventors: Hiroshi Takahashi, Kawasaki; Kazunori Bannai, Tokyo; Tetsuya Fujioka, Yokohama; Kazushige Taguchi, Warabi; Susumu Shiina, Tokyo, all of Japan

[73] Assignee: Ricoh Company, Ltd., Tokyo, Japan

[21] Appl. No.: 996,094

[22] Filed: Dec. 23, 1992

[30] Foreign Application Priority Data

Dec. 27, 1991 [JP] Japan .................................. 3-346816
Dec. 27, 1991 [JP] Japan .................................. 3-346817
Sep. 2, 1992 [JP] Japan .................................. 4-234982

[51] Int. Cl.⁵ .................... H04N 1/04; G03B 27/32; B65H 29/30
[52] U.S. Cl. .................................. 358/474; 355/25; 358/488; 358/496; 358/497; 358/498; 271/193
[58] Field of Search ............ 355/308, 25; 271/191, 271/193; 358/400, 401, 486, 488, 496, 497, 498

[56] References Cited

U.S. PATENT DOCUMENTS

| | | | |
|---|---|---|---|
| 3,594,079 | 7/1971 | Murgas | 355/50 |
| 4,645,331 | 2/1987 | Berger | 355/25 |
| 4,823,395 | 4/1989 | Chikauchi | 382/48 |
| 4,856,769 | 8/1989 | Andrew et al. | 271/193 |
| 4,942,482 | 7/1990 | Kakinuma et al. | 358/498 |
| 4,972,271 | 11/1990 | Koumura | 355/25 |
| 4,982,235 | 1/1991 | Fujino | 358/498 |
| 4,985,617 | 1/1991 | Ogushi | 358/482 |
| 5,119,136 | 6/1992 | Morikawa | 355/235 |

*Primary Examiner*—Edward L. Coles, Sr.
*Assistant Examiner*—Kimberly A. Williams
*Attorney, Agent, or Firm*—Oblon, Spivak, McClelland, Maier & Neustadt

[57] ABSTRACT

An image reader for reading a book document laid on a document table in a spread position by optically scanning the surface of the document. The edge of the document on the side where scanning for reading the document starts, the position of an image on the document, the size of the document, the edge of the document on the side where the leaf of the document begins to be turned over and so forth are detected on the basis of data derived from the optical scanning of the surface of the document.

19 Claims, 12 Drawing Sheets

IMAGE READER AND BOOK DOCUMENT READER WITH A PAGE TURNING CAPABILITY FOR AN IMAGE FORMING APPARATUS

BACKGROUND OF THE INVENTION

The present invention relates to an image reader and a book document reader with a page turning capability which are associated with a copier, facsimile transceiver or similar image forming apparatus for reading a document in the form of a book.

A conventional image reader for a book document has a document table on which a book document is laid spread and face up, a glass platen contacting the spread surface of the document, and scanning optics facing the document with the intermediary of the glass platen for optically scanning it (referred to as Prior Art I hereinafter). Another conventional image reader optically scans, or traces, the surface of the book document held in the above-mentioned position by use of a contact type optical read sensor (referred to as Prior Art II hereinafter). The problem with Prior Art I is that a book document has to be moved from a position for turning the pages to a scanning position, resulting in a low scanning efficiency and a bulky construction. Prior Art II is practicable without resorting to a bulky construction. However, since Prior Art II is not provided with means for pressing the spread surface of a book document, it is likely that the surface of the document rises away from the document table and cannot be stably scanned.

In the light of the above, there has been proposed a device capable of reading a book document while turning over the leaves of the document, i.e., a multifunction document scanner (MFDS), as disclosed in Japanese Patent Application No. 193589/1990 by way of example. The MFDS includes a document table having a document loading surface, a belt extending along the document loading surface while being partly spaced part from it, and a page turning and reading unit. The page turning and reading unit has leaf accommodating means, leaf attracting means, leaf separating means, reading means, etc. After a book document has been set on the document loading surface in a spread position, the page turning and reading unit is moved relative to the surface of the document to read the document while sequentially turning over the leaves of the document. The MFDS, therefore, fully automates the time and labor consuming operation for turning over the leaves as well as the document scanning procedure, thereby remarkably enhancing the productivity of, for example, copies.

The prerequisite with the MFDS is that the size of the book document laid spread on the document table be detected to determine a reading area and a page turning area of the document. To meet this requirement, in the MFDS, the edge of the spread book document is detected by an exclusive sensor or by image processing while the page turning and reading unit is in a prescanning movement. Then, the outputs of an encoder mounted on a turn-over roller are counted to determined the size of the document and thereby the reading area and page turning area.

However, regarding a book document or similar relatively thick document, the edge of the surface of the document changes in position with the change in the thickness of the document, pages at which the document is spread, etc. It is, therefore, preferable to adequately set up the position for starting scanning the document and the position for starting turning over the leaf in matching relation to the actual edge of the document surface, actual image position, etc. Otherwise, the page turning operation would become defective and, in the worst case, errors would be introduced in images to be taken in or printed out.

SUMMARY OF THE INVENTION

It is, therefore, an object of the present invention to provide an image reader and an image reader with a page turning capability for an image forming apparatus which are capable of scanning a book document while turning over the pages thereof with reliability.

In accordance with the present invention, an image reader comprises a document table, and an image reading unit for reading an image of a book document laid on the document table in a spread position by optically scanning the surface of the book document. The image reading unit detects a position of an edge of the uppermost leaf of the book document by starting scanning at a home position.

Also, in accordance with the present invention, a device for reading a book document while turning over leaves of the book document comprises a page turning section for turning over the leaves of the book document laid on a document table in a spread position by being moved on the surface of the book document, and an image reading section constructed integrally with the page turning section for reading an image printed on the book document by scanning the surface of the book document in a direction opposite to a direction of movement of the page turning section. the device detects the edge of the surface of the book document on a page turn start side (i.e., in order to determine the location of the edge to be grasped to initiate a page turning operation) on the basis of data read by the image reading section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
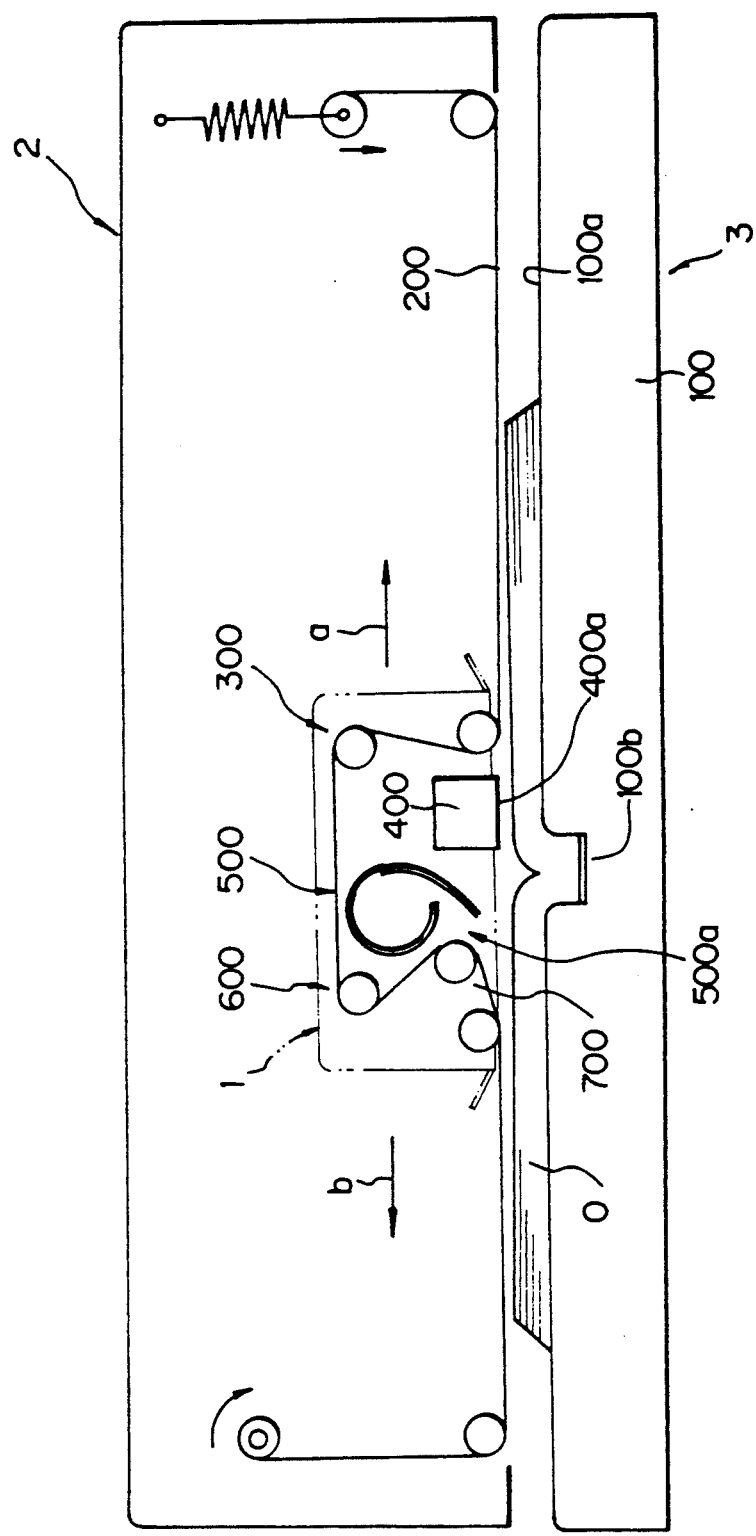
FIG. 1 is a section showing an MFDS to which the present invention is applied.

To better understand the present invention, an MFDS to which the present invention is applied will be described first. As shown in FIG. 1, the MFDS includes a document table 100 on which a book document O is laid in a spread position. A belt 200 extends along the document loading surface 100a of the document table 100 for pressing the spread surface of the book document (with the book document referred to herein as document O) A reading unit 1 is made up of bypass forming means 300, reading 400, leaf accommodating means 500, leaf attracting means 600, and leaf separating means 700. The reading unit 1 is movable back and forth along the document loading surface 100a of the document table 100. The bypass forming means 300 spaces part of the belt 200 apart from the document loading surface 100a to thereby form a bypass 200a (see FIGS. 5-7). The reading means 400 is located in front of the bypass 200a with respect to a scanning direction (arrow a) and has a reading section 400a facing the document loading surface 100a. The leaf accommodating means 500 is located in parallel with the reading means 400 in the scanning direction and has an opening 500a. The opening 500a is open in a page turning direction (arrow b) opposite to the scanning direction a. The leaf attracting means 600 deposits unequal electric fields on the belt 200 to thereby cause the leaf of the book document O to electrostatically adhere to the belt 200. The leaf separating means 700 separates the leaf from the belt 200 due to the curvature of part of the belt 200 which faces the opening 500a of the leaf accommodating means 500.

Figure 2:
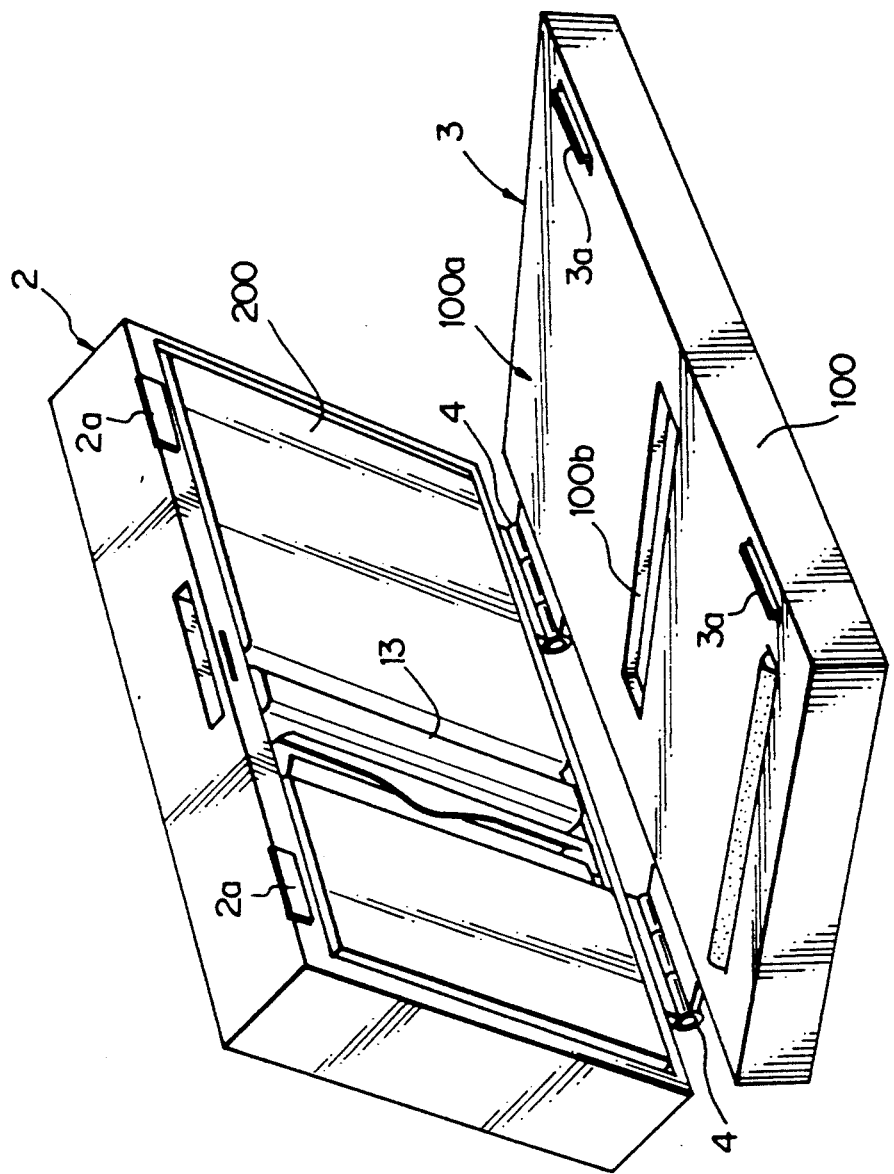
FIG. 2 is a perspective view showing the MFDS in a position ready to set a book document.

As shown in FIG. 2, the MFDS is generally made up of an upper unit 2 and a lower unit 3 which are connected together by a hinge 4 at the rear thereof in a front-open shell type configuration. The top of the lower unit 3 forms the document loading surface 100a. After the upper unit 2 has been opened, the book document O is laid spread on the document loading surface 100a with the bound portion thereof received in a center groove 100b formed at the center of the surface 100a. With the MFDS, therefore, the operator does not have to set the document O after spreading it and then positioning it face down. This insures extremely efficient and easy setting of the document O. The belt 200 and reading unit 1 are built in the upper unit 2. When the upper unit 2 is closed, magnets 3a affixed to the lower unit 3 attract magnetic plates 2a affixed to the upper unit 2. As a result, the belt 200 and reading unit 1 are held in close contact with the spread surface of the document O.

Figure 3:
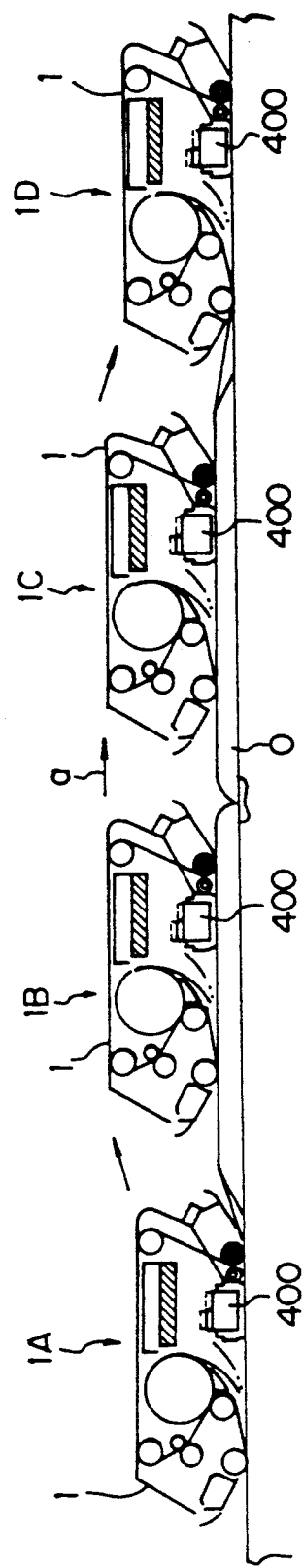
FIG. 3 is a sectional side elevation demonstrating a reading operation of a reading unit included the MFDS.
Figure 4:
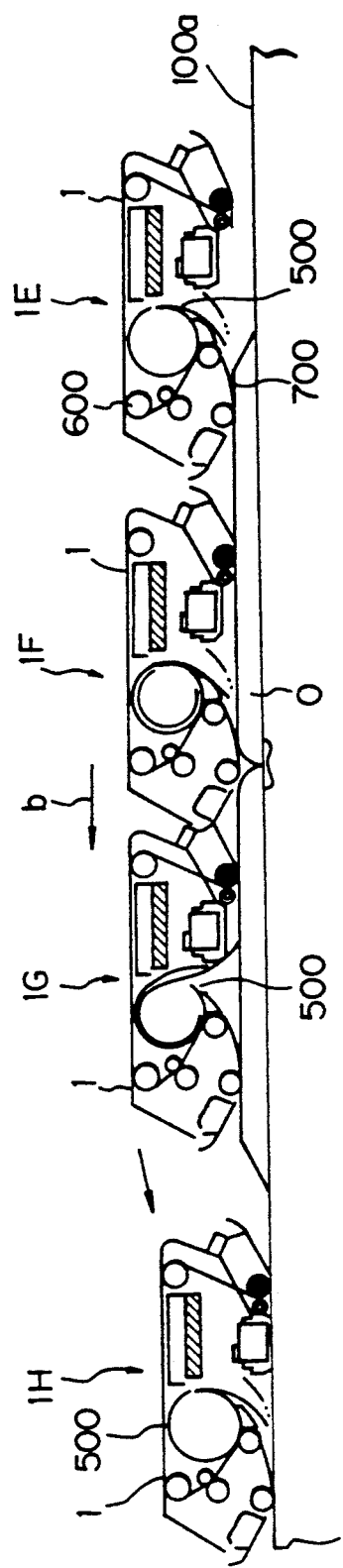
FIG. 4 is a view similar to FIG. 3, demonstrating a page turning operation of the reading unit.

As shown in FIG. 3, the reading unit 1 is moved from a position 1A to a position 1D via positions 1B and 1C in the scanning direction a with the upper unit 2 closed. During this scanning movement, the reading unit 1 causes the reading means 400 to read the spread surface of the book document. On the other hand, as shown in FIG. 4, the reading unit 1 is moved or returned from a position 1E to a position 1H via positions 1F and 1G in the page turning direction b, while causing the leaf attracting means 600 (belt 200), leaf separating means 700 and leaf accommodating means 500 to turn over the leaf of the document O. For details of a mechanism for driving the reading unit 1 and drive control means associated therewith, a reference may be made to, for example, previously stated Japanese Patent Application No. 193589/1990.

The construction and operation of the MFDS will be described specifically hereinafter.

As shown in FIGS. 3 and 4, the reading unit 1 is moved back and forth along the spread surface of the book document O while moving up and down. As a result, the surface of the document O is traced by a read sensor unit 13 (FIG. 5) included in the reading means 400 while being urged toward the document loading surface 100a by the belt 200 and reading unit 1. The read sensor unit 13 is rotatable relative to the reading unit 1 to some degree about an axis extending in the main scanning direction. Therefore, although the scanning surface of the read sensor unit 13 may incline due to the undulation of the document surface, it is capable of reading the document with accuracy by following the undulation. However, when the document O laid spread on the document table 100 is thick, the undulation of the document surface, especially the difference in level between the edges and the intermediate bound portion, is noticeable. In the light of this, the read sensor unit 13 is so biased as to press the document surface and has the edges of the scanning surface rounded. Even with such an implementation, it is likely that the read sensor unit 13 is caught by the document O due to the difference in level when the document O is thick.

Figure 6:
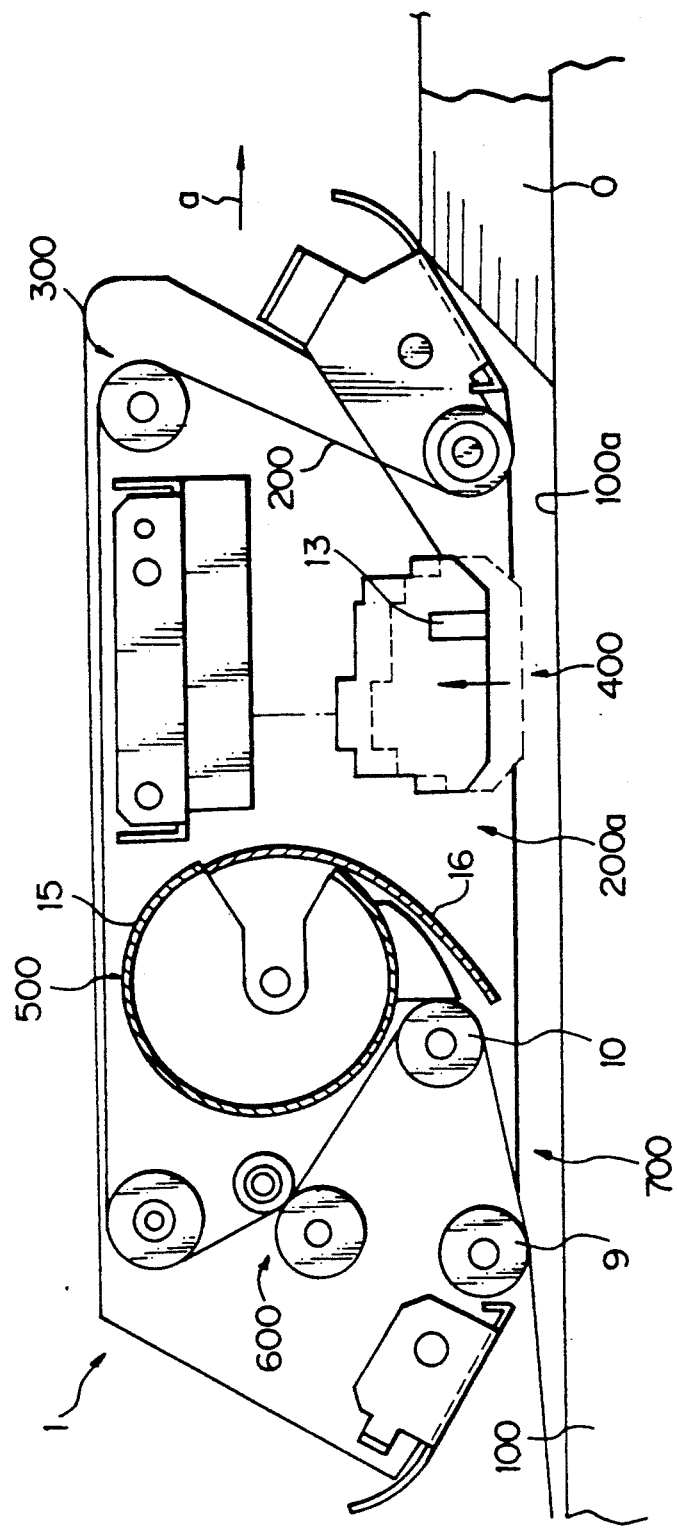
FIG. 6 is a section showing the reading unit located at a edge of the book document.

The read sensor unit 13 is movable up and down relative to the reading unit 1 and protrudes toward the underside of the unit 1 during scanning. Specifically, the read sensor unit 13 has a glass surface at the bottom thereof. The glass surface is movable about 5 millimeters upward and about 10 millimeters downward relative to the bottom of the reading unit 1, i.e., a smooth document surface. The glass surface traces the document surface while pressing it downward due to gravity or a bias acting on the read sensor unit 13. A rotary solenoid, not shown, is mounted on the rear of the rear side wall of the reading unit 1. When energized by a command from a controller, the rotary solenoid raises, or retracts, the read sensor unit 13 by about 5 millimeters into the reading unit 1, as shown in FIG. 6.

Figure 7:
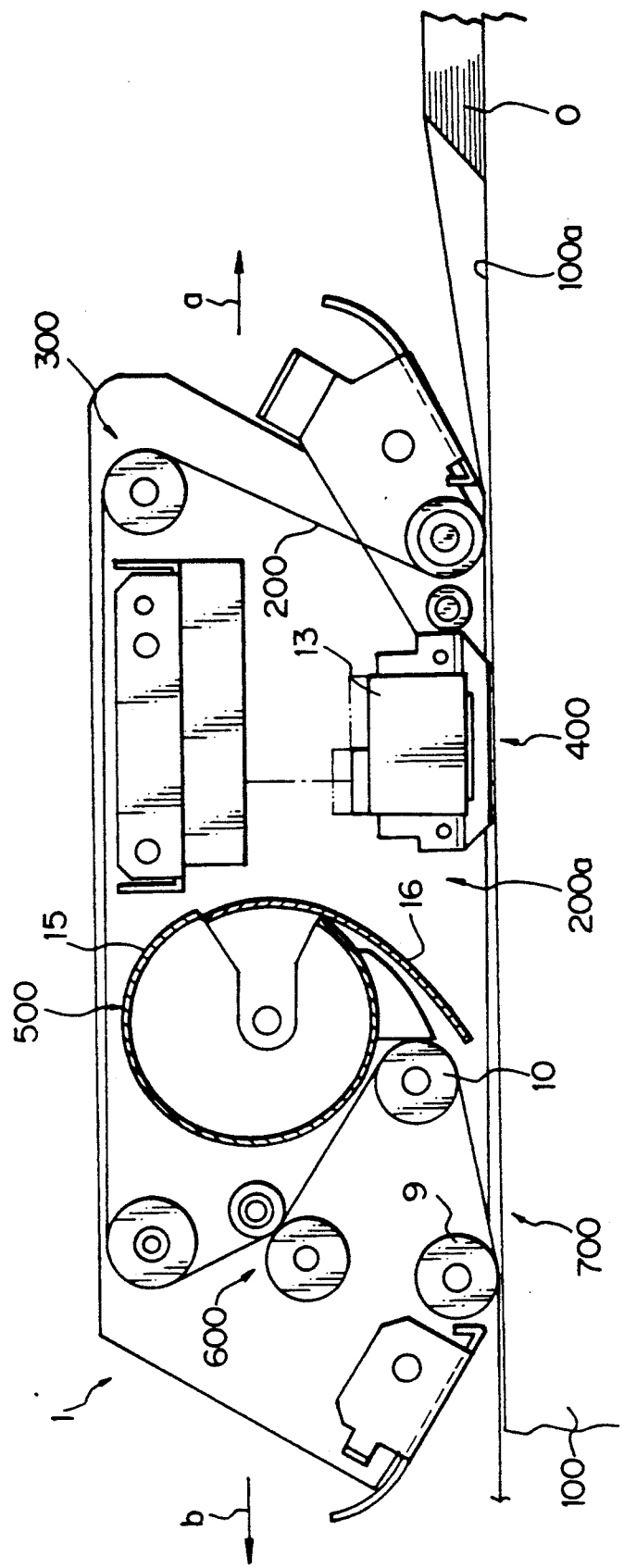
FIG. 7 is a section showing the reading unit located at a scan start position'.

FIG. 7 shows the left edge of the document O and the reading unit 1. As the reading unit 1 sequentially turns over the right leaves of the document O, the thickness of the left edge of the document O sequentially increases in thickness. Usually, therefore, the edge of the uppermost leaf at the lefthand side of the document O is sequentially shifted upward and rightward. On the other hand, the right leaves of the document O sequentially decrease in thickness in inverse proportion to the left leaves; the edge of the uppermost leaf is sequentially shifted downward and leftward.

Figure 8:
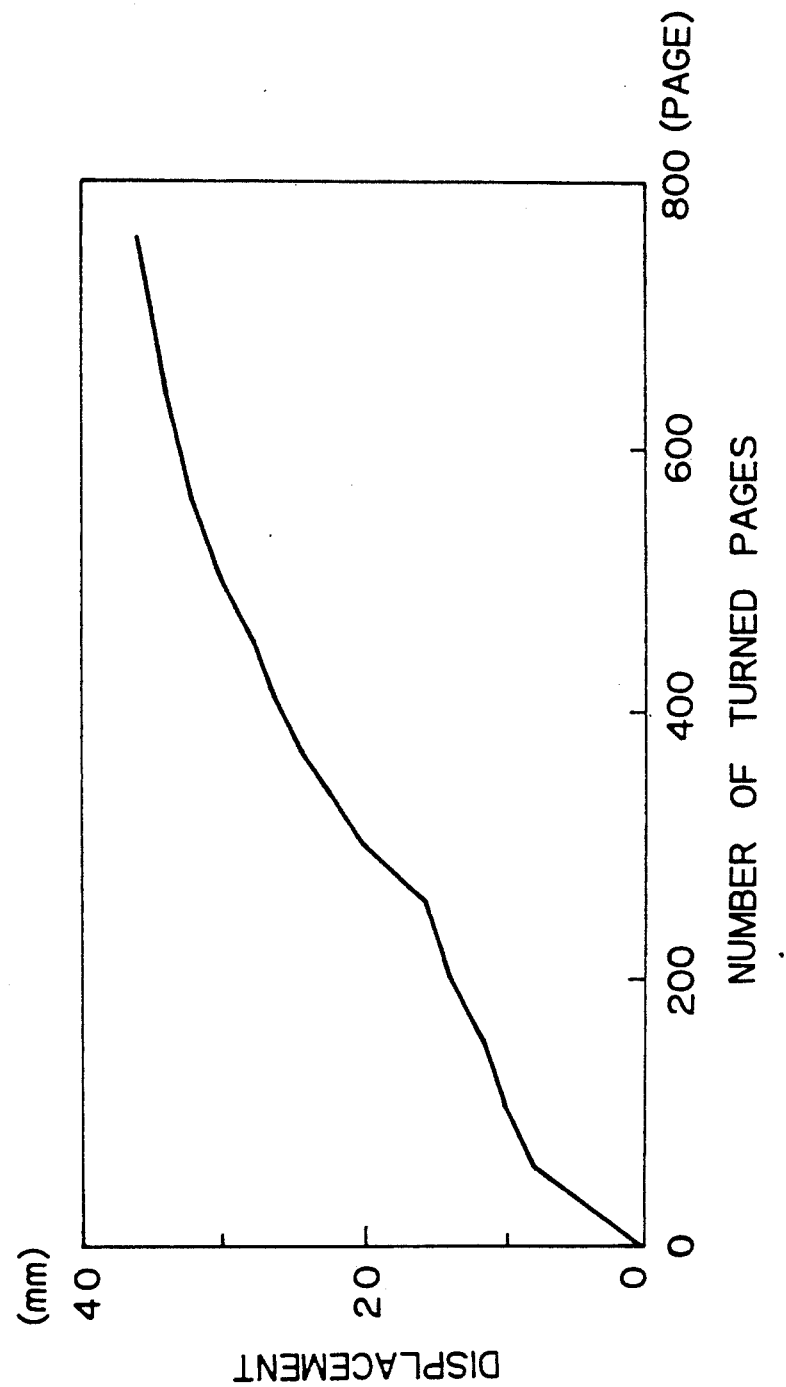
FIGS. 8, 9 and 10 each plots the transition of the left edge of a particular book document.
Figure 9:
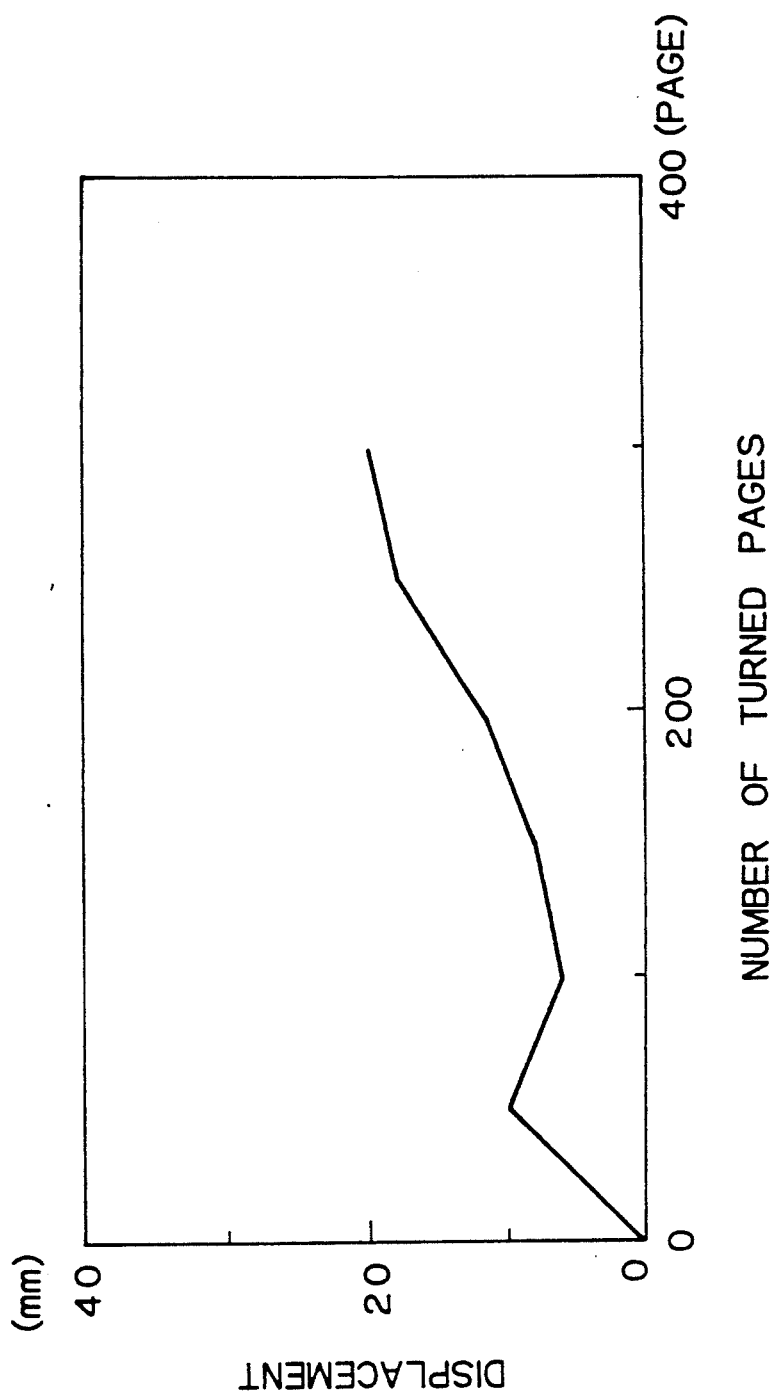
Figure 10:
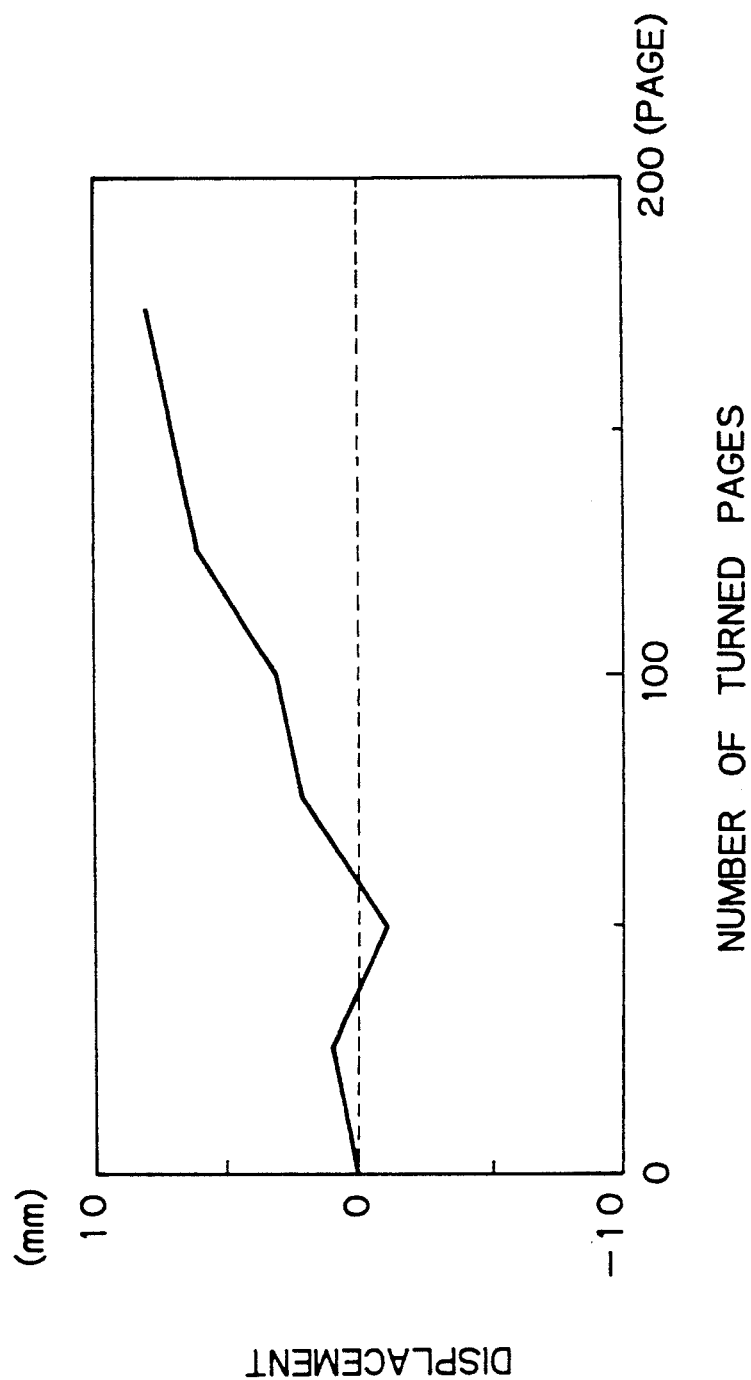

FIGS. 8-10 each plots a specific transition of the left edge of the book document O with respect to the number of leaves turned over. In FIGS. 8-10, the initial position of the left edge of the document O is assumed to be zero, and the displacement in the rightward direction is indicated in millimeters. Specifically, FIGS. 8-10 are respectively associated with a book document having a thickness of 20 millimeters and 750 pages, a book document having a thickness of 12 millimeters and 300 pages, and a book document having a thickness of 9 millimeters and 180 pages. All of these documents are of B4 size in a spread position. As FIGS. 8-10 indicate, the displacement of the left edge of a book document ascribable to the turn-over of leaves does not always increase monotonously since it is influenced by the change in the shape of the intermediate bound portion of the document. When a relatively thin book, e.g., one shown in FIG. 6 is used, the displacement may even decrease, i.e., goes negative since the bound portion of a document slides in the right-and-left direction while the leaves are turned over. In addition, the displacement depends on the size, thickness and material of a book document.

The displacement of the document O in the up-and-down direction is automatically corrected since the reading unit 1 moves up and down along the spread surface of the document O. However, the displacement in the right-and-left direction, i.e., the position where the read sensor unit 13 starts reading the document varies by about 40 millimeters at maximum. Should the document image be scanned, processed or printed without such a variation being corrected, the scanning operation would become defective and/or a critical registration error would occur. It is possible to correct the deviation in the displacement of the edge of the document O by sequentially changing the document pressing position and document scan start position of the read sensor unit 13 as the leaves of the document are turned over one after another. It has been customary to cause a controller to calculate the position of the edge of a book document on the basis of a document size entered or sensed. Specifically, when a book document is of A3 size when laid spread, the position of the edge thereof is determined to be about 210 millimeters apart from the center of the set position. Then, the read sensor unit 13 starts reading the document at a position about 30 millimeters apart from the home position of the reading unit 1. In such a case, it is a common practice to energize the previously stated rotary solenoid when the reading unit 1 is located at the home position so as to raise the read sensor unit 13, and then to cause the reading unit 1 to start moving in the scanning direction. Subsequently, when the read sensor portion of the read sensor unit 13 reaches a position 5 millimeters short of the edge of the book document, the read sensor unit 13 is lowered. Then, after the read sensor unit 13 has moved 5 millimeters in the scanning direction, it starts reading image data from the edge of the document. The read sensor unit 13 is also raised away from the document surface in the intermediate bound portion of the document. The bound portion of the document is 240 millimeters apart from the home position since the center of the document table 100 is used as a reference. Therefore, the read sensor unit 13 is raised away from the bound portion of the document over a width of ±10 millimeters around the center of the document table 100, i.e., a width of 230 millimeters to 250 millimeters as measured from the home position on the basis of the scanning control addresses of the reading unit. Of course, such a width may be selected on the basis of the kind of a book document.

However, the left edge of the document O is apt to catch the edge of the read sensor unit 13, as stated earlier. If the reading unit 1 runs onto the edge of the document O and the read sensor unit 13 is lowered to trace the document surface, it is likely that the left edge of the document is dog-eared. The dog-ear would make the reading operation defective. In addition, even though the document O may have a cover of regular size, e.g., A4 or B5, the size of the spread pages of the document is not always the same since it is reduced by the binding margin.

Figure 11:
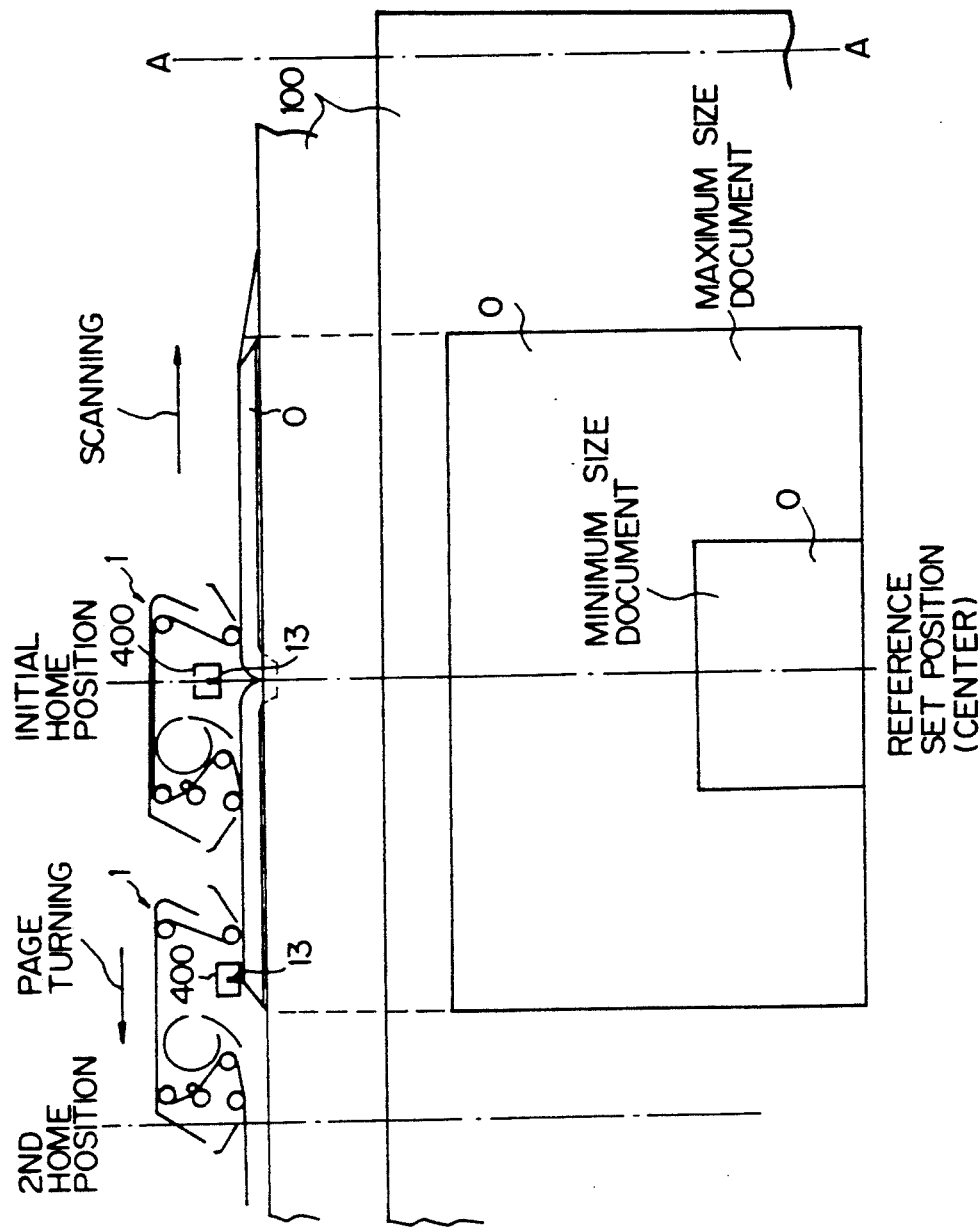
FIG. 11 shows how to detect the size of a book document.

To eliminate the above problems, the present invention locates the reading unit 1 at an initial home position close to the intermediate bound portion of the document O in the event of detecting the size of the document O. Specifically, as shown in FIG. 11, the document reader in accordance with the present invention locates the read sensor unit 13 of the reading unit 1 at an initial home position corresponding to the intermediate bound portion of the document O laid spread on the document table 100.

More specifically, while the read sensor unit 13 is located at the initial home position, the operator sets the document O on the document table 100 and then closes the upper unit 2. After the document O has been detected, the read sensor unit 13 is lowered to press the spread surface of the document O and starts reading it. Then, the reading unit 1 starts moving from the intermediate bound portion of the document O to the scan start side, i.e., toward the left edge of the document O. During this initial movement of the reading unit 1, the read sensor unit 13 scans the left page of the document O to determine the position of an image existing there. As the reading unit 1 further moves, the read sensor unit 13 senses the edge of the left page of the document O, i.e., the edge on the scan start side. Hence, even if the document O is not of regular size or if the document size is not known, a sensor built in the read sensor unit 13 and also serving to read an image accurately determines the size of the document O.

As stated above, the present invention locates the read sensor unit 13 above the spread surface of the document O beforehand in the event of determining the document size. This prevents the read sensor unit 13 from running onto the edge of the document O at such a stage of operation. Moreover, the size of the spread document O is surely and accurately determined on the basis of the distance from the intermediate bound portion to the edge of the left page. Consequently, the present invention protects the document O from dog-ears and can surely determine the size of the document O even if the document O is of the kind unable to have the size and thickness thereof specified.

Figure 12:
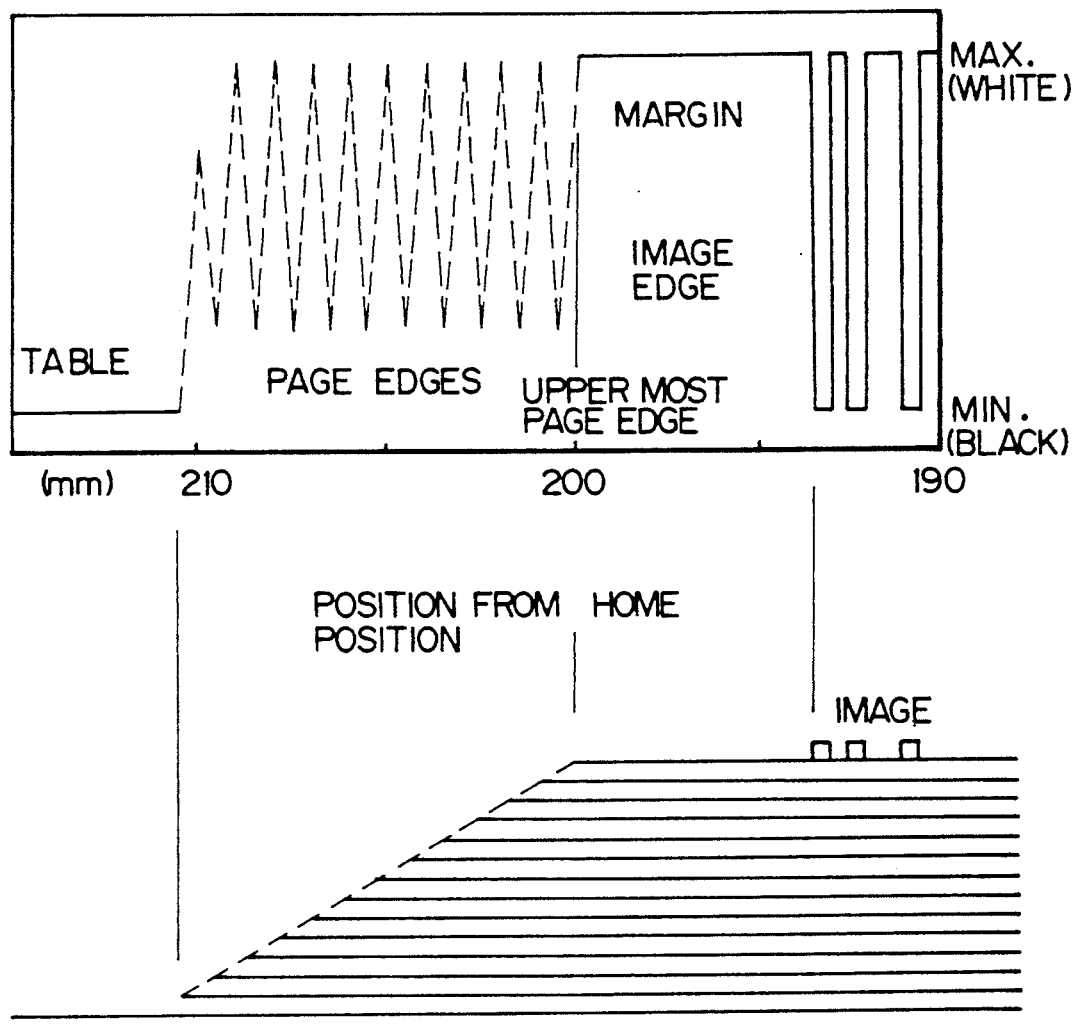
FIG. 12 is indicative of specific data representative of the edge of a book document.

FIG. 12 shows specific data associated with the edge of the spread book document O and produced by a read sensor implemented with the system of the present invention. As shown, assuming that the spread document size is A3, the edge of the document is about 210 millimeters (measured in terms of, for example, the number of encoder pulses) apart from the central set position (initial home position) of the read sensor and is about 30 millimeters apart from a second home position (left end in FIG. 11) assigned to the read sensor unit 13. The second home position is used as a reference position for starting scanning an image, as will be described later specifically. The edge of the document O is detected on the basis of a change in the data read by particular pixels of the read sensor which occurs in the subscanning direction. Specifically, as the read sensor unit 13 starts reading the left page of the document O, image data associated with the left page are randomly detected.

Most of book documents have white background, and generally characters or similar images do not exist over a width of more than ten millimeters as measured from the edge of a book document. Hence, the present invention determines a portion of the document O where the same color continues, as represented by the output of the read sensor, as a margin. Preferably, a plurality of sensor outputs should be used to enhance accurate decision. Subsequently, the read sensor senses stripes extending in the main scanning direction and representative of the edges of the consecutive leaves of the document O and, thereafter, senses the document loading surface (black) 100a of the document table 100. As a result, as shown in FIG. 12, the position where the stripe pattern extending in the main scanning direction begins is representative of the edge of the uppermost leaf of the document O.

Regarding the specific document O shown in FIG. 12, it is determined by the above procedure that the edge of the document is 200 millimeters apart from the initial home position, and that the position where the image begins in the scanning direction is 193 millimeters apart from the initial home position. These data and document size data inputted beforehand are processed to determine the size of the document O. For example, a book document which is about 210 millimeters long as measured from the center to the edge is determined to be of A4 (spread A3) size, while a book document which is about 182 millimeters long is determined to be of B5 (spread B4) size. If desired, the distance between the center of a book document and the edge of the image area of the document may be used to determine the document size. Then, since the measured distance will be shorter than the actual distance to the edge of the document due to the bound portion having a sharp gradient, the resulting size data may be corrected to compensate for the decrement.

It should be noted that the initial home position where the read sensor unit 13 starts scanning, or prescanning, the book document O is not limited to the central set position stated above. Specifically, any suitable initial home position may be selected which lies in an area corresponding to the minimum spread document size shown in FIG. 11, i.e., the minimum size with which image reading and page turning operations are practicable (A5 in the invention). By starting scanning at such a position, it is possible to surely determine all of the sizes of book documents which can be used. Furthermore, the initial home position lying in the area corresponding to the minimum document size may be located in the vicinity of the scan start position (second home position). This allows all of the sizes of book documents which can be used to be surely determined only if the read sensor unit 13 is moved over the minimum range.

When the document set on the document table 100 is smaller than the minimum usable size, the present invention detects such a condition and displays an error on an operation and display board, not shown. For example, the prescanning and encoder pulse counting begin at the document set reference position or a reference position adjoining it or located at the right-hand side of it (upstream side in the prescanning direction). If the book document set on the document table 100 is of unusable size, the operation of the reading unit 1 is stopped without the read sensor unit 13 starting reading the image. At the same time, a message showing that the size of the book document is not adequate is displayed. This is successful in eliminating the faulty detection of a document size as well as malfunctions.

It is not necessary that the position where the read sensor unit 13 starts measuring the document length be coincident with the initial home position, FIG. 11, where it starts prescanning. For example, assume that a point A shown at the right end of FIG. 11 is selected as such a position. Then, after the rotary solenoid has been energized to raise the read sensor unit 13 away from the document O, the reading unit 1 starts moving in the page turning direction b, FIG. 1 After the reading unit 1 has run onto the right edge of the document, the read sensor unit 13 is lowered at a suitable position. As a result, the above-described measuring operation (prescanning and encoder pulse counting) is started at a position adjoining the position where the bound portion of the document is set or a position preceding it (right-hand side). This kind of procedure simplifies the control, as follows. After the read sensor unit 13 has read the document O the number of times corresponding to a set number of copies (first job), it is stopped at the reference position (start position) A shown in FIG. 11. This makes it needless to return the read sensor unit 13 to the scan start position side after the first job. In addition, the position where the read sensor unit 13 is stopped turns into a position where the unit 13 will start on an operation for determining the size of the next document before reading it a set number of times (second job).

In accordance with the present invention, the controller, not shown, energizes the rotary solenoid at the previously mentioned second home position shown in FIG. 11 so as to raise the read sensor unit 13. Then, the read sensor unit 13 starts scanning or reading a book document. At the edge of the document detected beforehand by the previously stated procedure, the read sensor unit 13 is lowered. Simultaneously with or just after this step, the read sensor unit 13 starts reading the image of the document O. After the read sensor unit 13 has fully read the image, the reading unit 1 is returned while turning over the leaf of the document O. Such an image reading and page turning sequence is repeated until a desired number of pages have been read.

As stated above, the present invention detects the edge of the image area of the book document O and then sets the read sensor unit 13 at the scan start position. Hence, the read sensor unit 13 rides on the document O stably. Moreover, an image lying in a valid area and free from deviations is attainable with no regard to the varying position of the edge of the document O. Such an image can be stored or printed out in a desirable manner.

As shown in FIGS. 8–10, the position for starting scanning the image of the book document O and the image position at the edge of the document O also change due to the repetitive page turning operation. In the light of this, the present invention detects the edge of the document O every time the page turning operation is repeated a predetermined number of times, in the same manner as during the previously stated size detection at the time of when the document is in the home position. For this purpose, the present invention uses a read sensor bifunctioning as image reading means and edge detecting means. Specifically, when the reading unit 1 reaches a position adjoining the bound portion of the document O while turning over the leaf of the document, the read sensor unit 13 is lowered to press the spread surface of the document and start scanning it. As a result, the edge of the document matching the increment of the pages is sequentially detected by the read sensor unit 13 as during the size detection when the document is in the home position. In this case, since the edge of an ordinary book document does not abruptly change when one leaf thereof is turned over, the read sensor unit 13 may start on an edge detecting operation at a position several ten millimeters short of the edge of the left page of the document. This can be done on the basis of data detected during the initial homing operation or the last page turning operation. Further, the detection may be executed every time several pages or several ten pages are read so as to correct the data representative of the edge of the document. Then, the reading unit 1 can turn over the leaves while moving at a higher speed, enhancing the productivity as to image reading and page turning.

Figure 13:
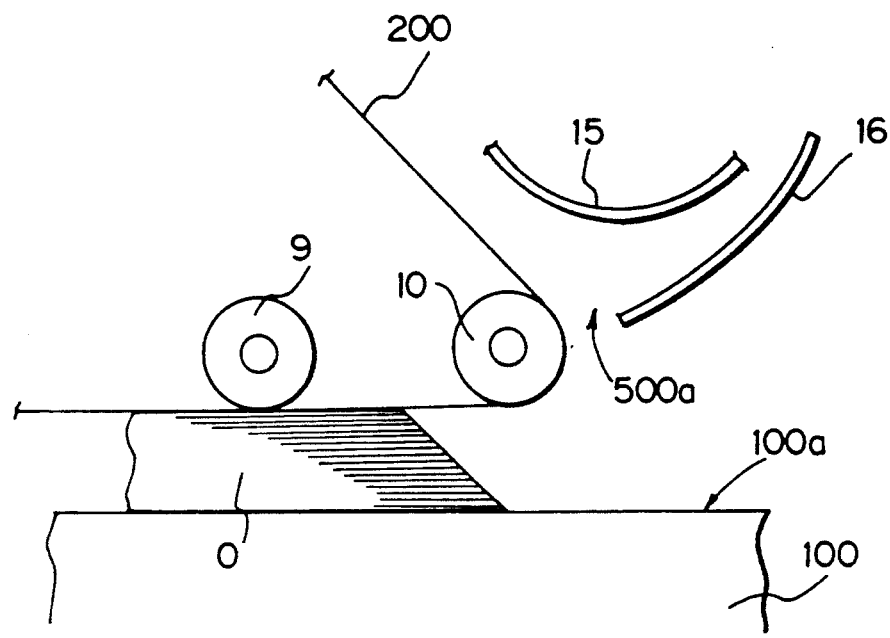
FIG. 13 shows a position for starting turning the leaves of a book document.

Now, a book document in a spread position is symmetrical in the right-and-left direction, i.e., the right and left pages of the document are basically equal in size. It follows that the scan end position of a book document 10 can be easily derived from the document size which is determined by the scan start position detected by the above procedure. However, the problem is that the scan end position, i.e., the right edge of a book document changes like the left edge. To eliminate this problem, it has been customary to cause the reading unit 1 to start turning the page at a position shifted about 85 millimeters to the right from the right edge of the document, as represented by the position 1E in FIG. 4. Then, as shown in FIG. 13, a separation roller 10 has only to be located at the right-hand side of the right edge of the document O. Stated another way, the function of the reading unit 1 will not be effected at all even if the unit 1 is moved to the right slightly more than expected. However, when the position where the reading unit 1 starts turning the page is fixed as stated above, the reading unit 1 has to always overrun to the right of the right edge of the document O an extra distance covering the expected displacement of the right edge of the document O.

Considering the above situation, the present invention detects a scan end position or page turning position on the basis of image data associated with the right edge of the document O in the same manner as it detects the scan start position. As a result, the position where the reading unit 1 starts turning over the leaf is corrected in matching relation to the detected scan end position. The data associated with the right edge is detected in the same manner as the left edge and as shown in FIG. 12, although the direction is opposite. The valid image range at the right edge can also be taken in or printed out if regulated in the previously stated condition. As the page turn start position of the reading unit 1 is sequentially corrected in conformity to the right edge of the document O, the reading unit 1 does not have to perform the wasteful overrunning and, therefore, enhances the productivity regarding the turn-over of leaves.

In the device of the present invention, the reading means 400 of the reading unit 1 is located at the right of the leaf accommodating means 500. Hence, at the next scan start position, the page has been fully turned without fail. This, coupled with the fact that the page turning motion completes automatically during the iterative scanning operation, protects the page turning operation from the influence of the left edge of the document O which varies in position with the number of leaves.

Figure 5:
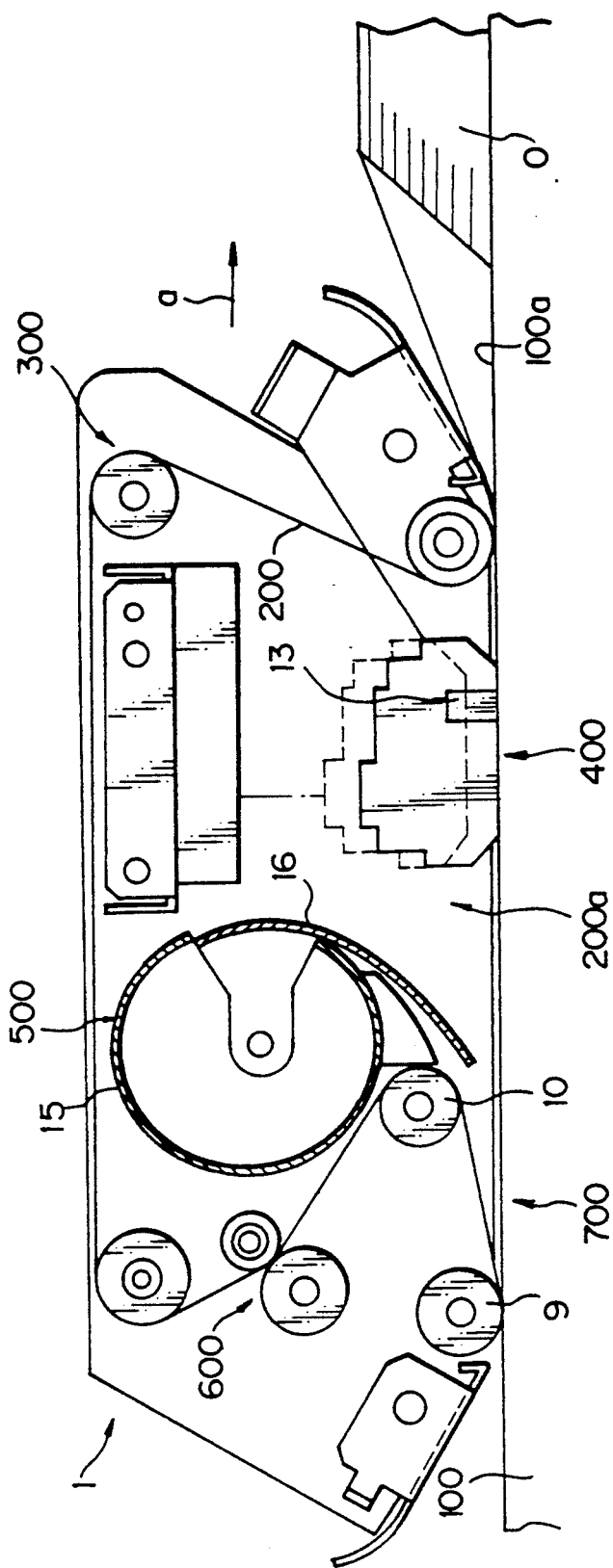
FIG. 5 is a section showing how the reading unit starts scanning a book document.
Figure 14:
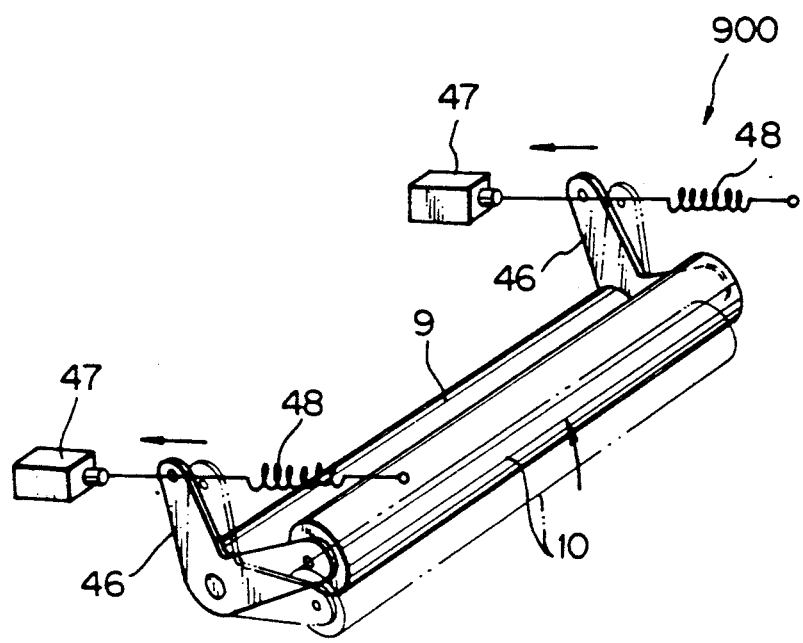
FIG. 14 is a perspective view of means for moving a separation roller.

In FIG. 5, the leaf separating means 700 is shown as having the separation roller 10 fixed at a higher level than a turn-over roller 9. Alternatively, as shown in FIG. 14, displacing means 900 may be used to move the separation roller 10 at a predetermined timing. Specifically, the displacing means 900 is made up of a pair of levers 46, a pair of solenoids 47, and a pair of return springs 48. The levers 46 are each configured in the form of a letter L and rotatably connected to each end of a shaft supporting the turn-over roller 9 at the corner of "L". The separation roller 10 is rotatably supported by the substantially horizontal extensions of the levers 46. The solenoids 47 are located at the opposite side to the horizontal extensions of the levers 46, and each is drivably connected to the substantially vertical extension of the associated lever 46. The return springs 48 are each anchored at one end at the opposite side the associated solenoid 47 and at the other end to the vertical extension of the associated lever 46. Usually, i.e., when the solenoids 47 are not energized, the separation roller 10 is located at a position indicated by a phantom line in FIG. 14, i.e., at the same level as the turn-over roller 9. In the event when the page should be turned over, the solenoids 47 are energized to move the separation roller 10 to a position indicated by a solid line in FIG. 14, i.e., to a higher level than the turn-over roller 9.

Specifically, the solenoids 47 are energized when the reading unit 1 is moved in the page turning direction up to a position where the edge of the uppermost page of the document O is located substantially at the intermediate between the turn-over roller 9 and the separation roller 10. The time for energizing the solenoids 47 is determined by the size of the document O laid spread on the document table 100. More specifically, the period of time or the distance necessary for the edge of the uppermost leaf of the document O to reach an intermediate position between the turnover roller 9 and the separation roller 10 after the reading unit 1 has started turning the page and associated with the size of the document O is determined in terms of, for example, the number of pulses fed to a stepping motor. The solenoids 47 are energized when the number of pulses coincides with the reference value of the book document size entered beforehand. As a result, the separation roller 10 is moved to the solid line position of FIG. 14 and as also shown in FIG. 13. In this condition, only the uppermost leaf of the document O electrostatically adhered to the belt 200 is separated from the others and then separated by the separation roller 10 due to the curvature of the roller 10. Subsequently, the leaf is sequentially rolled up into the leaf accommodating section 15 by the leaf attracting means 500 via the opening 500a and along the guide 16, as represented by FIG. 13 and the position 1F in FIG. 4. After this leaf has been fully turned over, the solenoids 47 are deenergized with the result that the separation roller 10 is returned to the phantom line position of FIG. 14 by the springs 48.

In the system wherein the separation roller 10 is moved to separate the leaf of the document O, only the edge of the leaf is electrostatically adhered to the belt 200, moved upward, and then introduced into the leaf accommodating section 15. Hence, what is extremely important with the leaf separating means 700 is the position where it causes the edge of the leaf to adhere. The present invention is capable of accurately detecting the edge of the document surface on the scan end side, i.e., on the turn-over start side while reading the document O. The time for causing the leaf separating means 700 for starting on separation is determined on the basis of the edge of the leaf on the turn-over start side detected by the read sensor. As a result, the leaf separating means 700 can electrostatically attract the edge of the leaf at an adequate position at all times despite that the edge of the document is displaced due to the repetitive page turning operation.

In accordance with the present invention, the time for raising the separation roller 10 in the event of page turning is determined on the basis of the edge on the scan end side and represented by the image data of the right edge read by the read sensor. Then, the displacing means 900 is controlled such that the leaf separating means 700 attracts the same amount of leaf at all times.

Further, assume a page turn mode wherein the reading unit 1 having turned over the leaf is simply returned to the right, as viewed in FIG. 11, without reading an image so as to repeat only the page turning operation (usually, the read sensor unit 13 is maintained in the retracted position). Even in this mode, the present invention can lower the read sensor to press the document O at a position ahead of the right edge of the document O, read the document, determine the time for raising the separation roller 10 in response to the resulting data, and control the displacing means 900 such that the leaf separating means 700 attracts the same amount of leaf at all times.

As stated above, the present invention detects the image range and edges of the document O so as to operate the read sensor unit 13 and displacing means 900 on the basis of the result of detection. The invention, therefore, can read the document O with accurate registration and turn over the leaves stably from the beginning to the end of the document O without resorting to independent sensing means.

In summary, in accordance with the present invention, the edge of a book document on the scan start side, image position of the document, and the edge of the document on the page turn start side are detected on the basis of data read by image reading means. This allows a scan start position, an image range to be read and a page turn start position to be adequately set up in matching relation to the actual edge and actual image position of the document, thereby enhancing the reliability of reading operation, reading accuracy, and page turning operation.

Various modifications will become possible for those skilled in the art after receiving the teachings of the present disclosure without departing from the scope thereof.

We claim:

1. An image reader comprising:
   a document table; and
   image reading means for reading an image of a book document laid on said document table in a spread position by optically scanning a surface of said book document, said image reading means detecting a position of an edge of an uppermost leaf of said book document after starting scanning at a home position;
   wherein said home position is located with respect to said document table within a region occupied by a predetermined minimum sized book document positioned on said table, such that said image reading means detects an edge of an uppermost leaf during movement from said home position while scanning to detect an edge position of said uppermost leaf.

2. An image reader as claimed in claim 1, wherein a position where a stripe pattern detected by said image reading means and extending in a main scanning direction begins is determined to be the edge of the uppermost leaf.

3. The image reader of claim 1, further including a groove formed in said document table for receiving a binding of said book document.

4. The image reader of claim 1, further including a page turning assembly which includes a turn-over roller and a page separation roller, and wherein said page separation roller is movable relative to said turn-over roller.

5. An image reader comprising:
   a document table; and
   image reading means for reading an image of a book document laid on said document table in a spread position by optically scanning a surface of said book document;
   said image reading means detecting an edge of the book document on a scan start side on the basis of data read during an opposite direction scanning of said image reading means.

6. An image reader as claimed in claim 5, further comprising page turning means constructed integrally with said image reading means for turning a page of the book document by being moved in a direction opposite to a scanning direction of said image reading means for reading an image; and
   wherein after said page turning means performs a page turning operation a predetermined number of times, said image reading means scans the surface of the book document during the page turning operation, and detects at least one of an edge of said book document on a scan start side and a position of an image printed on the surface of said book document on the basis of said scanning during the page turning operation, whereby changes in position of an uppermost leaf resulting from turning of pages are accommodated.

7. An image reader comprising:
   a document table; and
   image reading means for reading an image of a book document laid on said document table in a spread position by optically scanning a surface of said book document;
   said image reading means detecting a position of an image printed on a surface of the book document on the basis of data read by said image reading means during scanning in a direction opposite to a direction of scanning for reading an image.

8. An image reader as claimed in claim 7, further comprising:
   page turning means constructed integrally with said image reading means for turning a page of the book document by being moved in a direction opposite to the scanning direction of said image reading means for reading an image; and
   wherein after said page turning means performs a page turning operation a predetermined number of times, said image reading means scans the surface of the book document during the page turning operation, and detects at least one of an edge of said book document on a scan start side and a position of an image printed on the surface of said book document on the basis of said scanning during the page turning operation, whereby changes in position of an uppermost leaf resulting from turning of pages are accommodated.

9. An image reader comprising:
   a document table;
   image reading means for optically scanning a surface of a book document laid on said document table in a spread position and face up in a scanning direction for reading an image to thereby read an image printed on said book document;
   edge detecting means for detecting one of an edge of the book document and an edge of the surface of said book document by causing said image reading means to scan said book document from a predetermined position on said book document with the image reading means scanning for edge detecting in a direction opposite to a scanning direction for reading an image; and document size determining means for determining a size of the book document on the basis of a distance between first and second positions, said first position located at one of a scan start position in the direction for reading an image and a position a predetermined distance apart from said scan start position in the direction for reading an image and said second position located at one of the edge of said book document and the edge of the surface of said book document.

10. An image reader as claimed in claim 9, wherein a reference scan start position of said image reading means for allowing said document size determining means to start operating is located in an area which accommodates a book document of smallest size in a spread position.

11. An image reader as claimed in claim 7, further comprising page turning means constructed integrally with said image reading means for turning a page of the book document by being moved on the surface of said book document in a page turning direction;

said edge detecting means starting detecting an edge of the book document by scanning in the page turning direction at a reference start position which is close to an edge where said image reading means ends the scanning in the scanning direction for reading an image and at a scan end position on said document table;

said image reader stopping, after an image reading operation has been repeated a predetermined number of times on the surface of the book document, a movement of said image reading means at said reference start position of said edge detecting means.

12. An image reader as claimed in claim 9, wherein said reference scan start position of said image reading means is located in close proximity to a reference position for setting the book document on said document table, and wherein said reference position is defined by a groove formed in the document table for receiving a bound portion of a book document.

13. An image reader as claimed in claim 12, further comprising reporting means for reporting, when the book document has a size which cannot be read by said document size determining means, that the size of said book document cannot be read.

14. A device for reading a book document while turning over leaves of said book document, comprising:

page turning means for turning over leaves of the book document laid on a document table in a spread position by being moved on a surface of said book document; and image reading means constructed integrally with said page turning means for reading an image printed on the book document by scanning the surface of said book document in a direction opposite to a direction which said page turning means moves during a page turning operation;

said device for reading a book document further including a device detecting an edge of the surface of the book document on a page turn start side based upon data read by said image reading means.

15. A device for reading a book document while turning over leaves of said book document, comprising:

page turning means for turning over leaves of the book document laid on a document table in a spread position by being moved on a surface of said book document; and image reading means constructed integrally with said page turning means for reading an image printed on the book document by scanning the surface of said book document in a direction opposite to a direction of movement of said page turning means;

said page turning means comprising:

leaf holding means for holding a leaf of the book document being turned over; and leaf attracting and separating means located in close proximity to said leaf holding means and including means for controlling said leaf attracting and separating means for closely contacting or adjoining the surface of the book document at the beginning of a page turning operation for causing a leaf of said book document to electrostatically adhere to said leaf attracting and separating means, and then moving toward said leaf holding means to feed said leaf into said leaf holding means;

wherein said means for controlling said leaf attracting and separating means controls said leaf attracting and separating means on the basis of position data associated with an edge of the surface of the book document on a page turn start side and wherein said position data is obtained by said image reading means by a scanning operation during which said image reading means scans in a direction opposite to a scanning direction for reading an image.

16. An image reader comprising:

a document table;

image reading means for reading an image of a book document laid on said document table in a spread position;

page turning means for turning a page of the book document; and detecting means for scanning, after said page turning means has turned a page of the book document a predetermined number of times, a surface of the book document and, based on data read during the scanning, detecting one of an edge of said book document located at a scan start side and an image position on said surface of said book document;

whereby a change in a position of an uppermost page due to page turning is accommodated.

17. A device for turning a page of a book document, comprising:

page turning means for turning a page of the book document laid on a document table in a spread position by moving on and along a surface of said book document;

detecting means for detecting an edge of the surface of the book document located on a side where a page turning operation begins; and control means for controlling a timing for said page turning means to turn a page on the basis of position data relating to said edge of the surface of the book document.

18. A device as claimed in claim 17, wherein said page turning means comprises:

leaf holding means for holding a leaf of the book document being turned over; and leaf attracting and separating means located in close proximity to said leaf holding means and including means for controlling said leaf attracting said separating means for closely contacting the surface of the book document at the beginning of a page turning operation for causing a leaf of said book document to electrostatically adhere to said leaf attracting and separating means, and then moving toward said leaf holding means to feed said leaf into said leaf holding means;

wherein said means for controlling said leaf attracting and separating means controls a timing for said leaf attracting and separating means to attract and separate the leaf on the basis of said position data.

19. A device for reading a book document, comprising:

page turning means for turning a page of the book document laid on a document table in a spread position by moving on and along a surface of said book document; and image reading means movable on and along the surface of the book document for reading an image printed on said book document;

said page turning means comprising:

leaf holding means for holding a leaf of the book document being turned over; and leaf attracting and separating means located in close proximity to said leaf holding means and including means for controlling said leaf attracting and separating means for closely contacting the surface of the book document at the beginning of a page turning operation for causing a leaf of said book document to electrostatically adhere to said leaf attracting and separating means, and then moving toward said leaf holding means to feed said leaf into said leaf holding means;

wherein said means for controlling said leaf attracting and separating means controls a timing for said leaf attracting and separating means to attract and separate the leaf on the basis of position data, and wherein said position data is produced by said image reading means when said image reading means scans the surface of the book document.

* * * * *